UNITED STATES PATENT OFFICE.

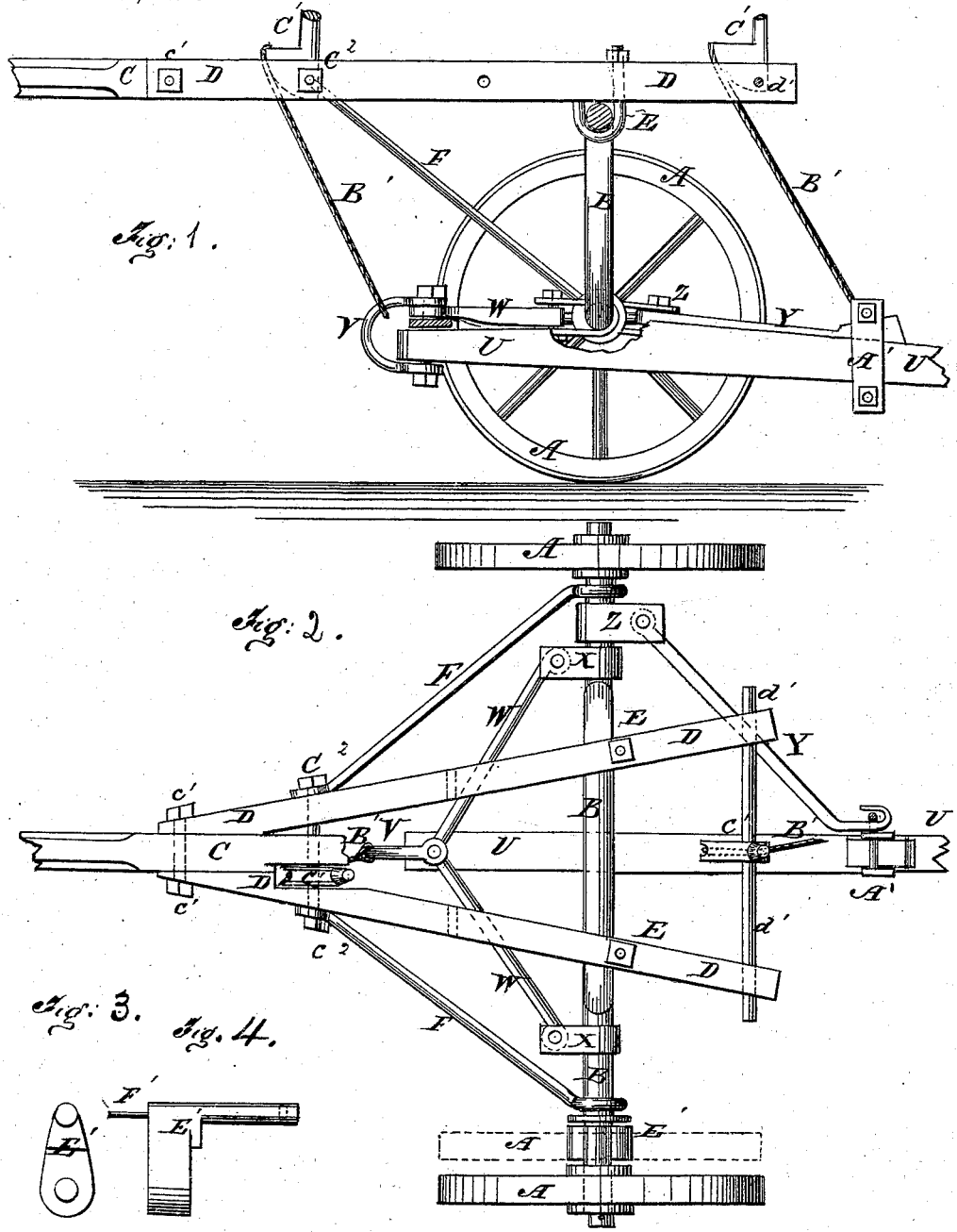

JAMES B. LUCAS, OF PELLSVILLE, ILLINOIS.

IMPROVEMENT IN CULTIVATORS AND PLOWS.

Specification forming part of Letters Patent No. 147,669, dated February 17, 1874; application filed July 19, 1873.

*To all whom it may concern:*

Be it known that I, JAMES B. LUCAS, of Pellsville, in the county of Vermilion and State of Illinois, have invented a new and Improved Combined Cultivator and Plow; and I do hereby declare that the following is a full, clear, and exact description of the same, reference being had to the accompanying drawing forming a part of this specification, in which—

Figure 1 is a sectional view; Fig. 2, a top view; Figs. 3 and 4, detail front and side views of the short axle.

The invention will first be described, and then pointed out in the claim.

A are the wheels, and B the axle. The latter is bent four times to form a middle bow. C is the tongue, which is secured to the hounds D 1 y the bolts $c^1 c^2$. The rear part of the hounds D is secured to the axle B, near its outer bends or angles, by a long bolt, $c^1$. The axle B and hounds D are further secured to each other by hook bolts or staples E, which pass through the said hounds and around the middle part of the said axle. F are braces, the rear ends of which are attached to the axle B near the inner ends of the hubs of the wheels A, and the forward ends secured to the hounds D by a bolt, $c^2$. U is a plow-beam, to the forward end of which is attached the clevis V, to which the draft is applied. To the forward end of the plow-beam U is secured, by means of the clevis V, the forward ends of two bars, W, the rear ends of which are pivoted to the couplings X, by which they are connected with the axle B at the inner ends of the hubs of the wheels A. Y is a brace-bar, the forward end of which is pivoted to a coupling, Z, by which it is connected to the axle B. The brace-bar Y is placed upon the mold-board side of the beam U, and its rear end is bent to lie along the side of the said beam, and to pass through the loop or bow of the coupling A', attached to the plow-beam. The extreme rear end of the brace Y is bent into hook form to prevent it from being drawn out of the said coupling A'. This construction allows the plow to have enough lateral movement to pass around stones or other obstructions, and to enable it to be raised and swung beneath the frame-work of the machine. To the forward end of the plow-beam U, or to the clevis V, is attached the lower end of a short chain or cord, B', the other end of which is attached to the cam of the lever C', so that by operating the lever C' the forward end of the plow-beam will be raised from the ground, allowing the plow to run upon its foot or heel. If desired, another lever, C', and chain B' may be connected with the bolt $d'$ and coupling A', so that by operating both levers the plow may be raised wholly from the ground. When desired to have one of the wheels A run at a different level from the other, one of the wheels A is removed, and the short crank-axle E' is slipped upon the journal of the axle B. The wheel is then placed upon the journal of the crank-axle E', which is secured in place by the brace-rod F', the rear end of which is attached to the crank-axle E', and its forward end to the hounds D, by the same bolt $c^2$ that secures the braces F to said hounds. The plow-beams are secured, when cultivators are used, to the end parts of the axle B by the couplings X, that secure the brace-rods W.

Having thus described my invention, what I claim as new, and desire to secure by Letters Patent, is—

The combination of the braces W, couplings X, brace Y, and couplings Z A' with the tongue C, hounds D, bent axle B, and braces F, substantially as herein shown and described, and for the purpose set forth.

JAMES B. LUCAS.

Witnesses:
C. H. WYMAN,
E. D. DURHAM.